United States Patent
Lynch

(10) Patent No.: US 6,812,400 B1
(45) Date of Patent: Nov. 2, 2004

(54) BIRD GUARD

(76) Inventor: Michael Lynch, 7758 Pickering Cir., Reno, NV (US) 89511

( * ) Notice: Subject to any disclaimer, the term of this patent is extended or adjusted under 35 U.S.C. 154(b) by 0 days.

(21) Appl. No.: 09/490,903

(22) Filed: Jan. 25, 2000

(51) Int. Cl.[7] ............................................. H02G 3/00
(52) U.S. Cl. .................. 174/5 R; 174/136; 174/138 F; 174/139
(58) Field of Search ............................. 174/1, 2, 5 R, 174/40 R, 135, 136, 137 R, 138 F, 138 R, 139, 168; 43/1; 256/11

(56) References Cited

U.S. PATENT DOCUMENTS

| | | | | |
|---|---|---|---|---|
| 1,598,155 A | * | 8/1926 | Salisbury | 174/5 R |
| 1,996,894 A | * | 4/1935 | Alvord | 174/5 R |
| 2,770,667 A | * | 11/1956 | Runde | 174/136 |
| 2,871,282 A | * | 1/1959 | Tipsord et al. | 174/136 |
| 2,941,029 A | * | 6/1960 | Stoeckel | 174/173 |
| 3,042,736 A | * | 7/1962 | Salisbury | 138/121 |
| 3,133,984 A | * | 5/1964 | Farough et al. | 174/138 F |
| 3,194,878 A | * | 7/1965 | Schneiderman | 174/138 F |
| 3,251,161 A | * | 5/1966 | Stirn | 174/136 |
| 3,555,625 A | * | 1/1971 | Hoban | 24/131 |
| 3,835,238 A | * | 9/1974 | West | 174/139 |
| 3,900,698 A | * | 8/1975 | Yotsugi | 174/136 |
| 4,234,753 A | * | 11/1980 | Clutter | 174/138 |
| 4,280,013 A | * | 7/1981 | Clutter | 174/5 R |
| 4,449,010 A | * | 5/1984 | Apperson et al. | 174/5 R |
| 4,453,353 A | * | 6/1984 | Killop et al. | 16/DIG. 13 |
| 4,741,097 A | * | 5/1988 | D'Agati et al. | 29/631 |
| 5,433,029 A | * | 7/1995 | Donoho et al. | 43/1 |
| 5,682,015 A | * | 10/1997 | Harben | 174/138 R |
| 6,005,196 A | * | 12/1999 | Spillyards | 174/138 F |
| 6,239,357 B1 | * | 5/2001 | Mabry et al. | 174/5 R |
| 6,255,597 B1 | * | 7/2001 | Bowling et al. | 174/138 F |
| 6,291,774 B1 | * | 9/2001 | Williams | 174/135 |

* cited by examiner

Primary Examiner—Dean A. Reichard
Assistant Examiner—Adolfo Nino
(74) Attorney, Agent, or Firm—Jack I. J'maev

(57) ABSTRACT

A dielectric device for protecting animals from becoming a short between power lines and poles or other lines.

In an alternate embodiment the device includes prongs to deter birds from landing on the protection device.

5 Claims, 2 Drawing Sheets

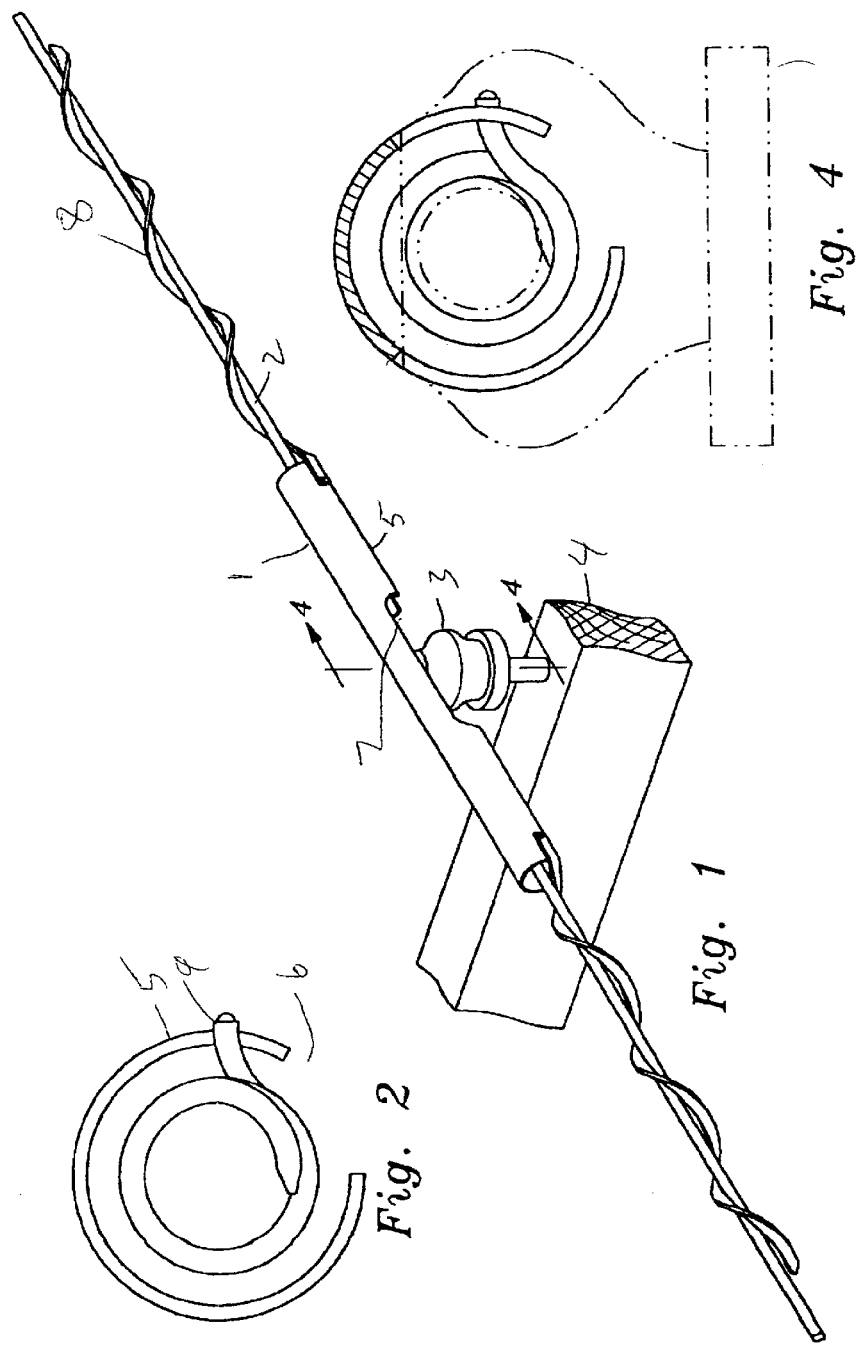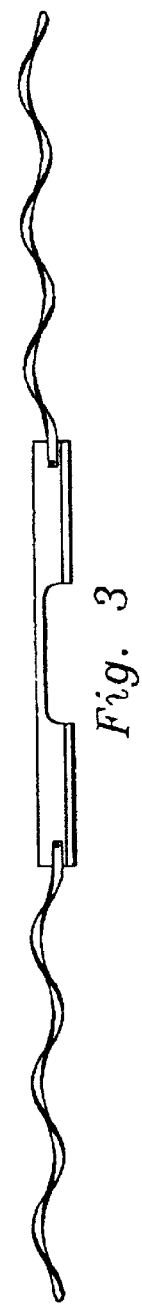

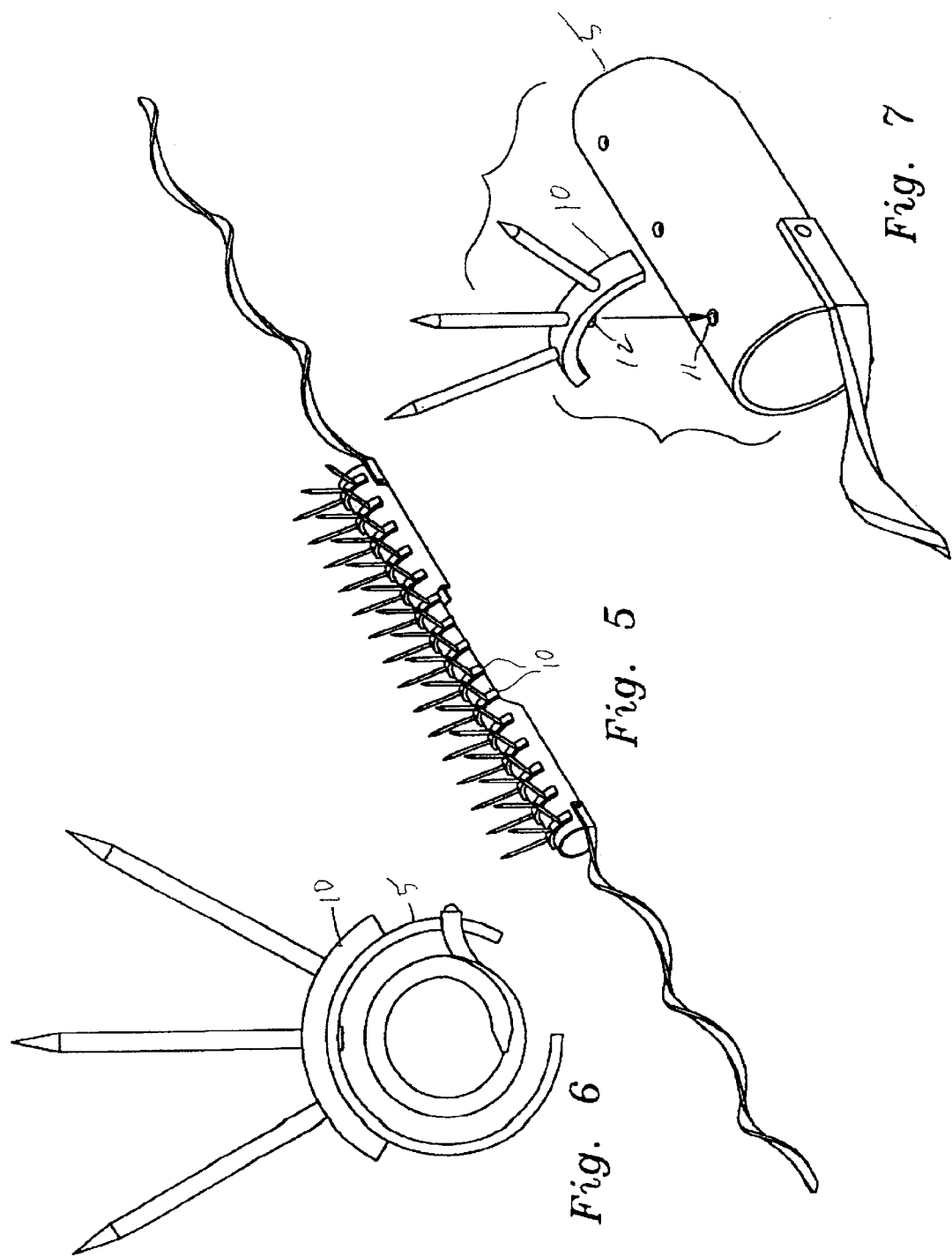

BIRD GUARD

BACKGROUND-FIELD OF INVENTION

This invention relates generally to the field of high powered transmission lines.

BACKGROUND OF INVENTION

For nearly a century man has been stringing high powered transmission lines from pole to pole to pole top. Wild birds have seen these lines as convenient places to roost. There have been instances throughout the West where a flock of black birds will leave a line nearly simultaneously and cause a dangerous swinging condition in the line. Also, right where the line attaches to the insulator above a pole, if the bird stretches its wings, like it will just before take off and that wing either contacts or comes close enough to contacting the pole or another line; the bird can become a shunt and the power might arc through the bird, killing it and disrupting power transmission. Applicant's invention overcomes these problems by discouraging birds from standing on the line and insulating them if they or their squirrel or chipmunk friends climb around poles insulators and lines.

SUMMARY & OBJECTS OF THE INVENTION

A first object of the invention is to provide an insulator to insulate a wild creature from the power in the line.

A second object of the invention is an attachment means that can be applied to a hot (charged) line.

A third object of the invention is a sequential system to allow building of a cover for certain applications, like over a building entrance.

A fourth object of the invention is a deterrent system to deter birds from alighting on the wire.

BRIEF DESCRIPTION OF DRAWINGS

FIG. 1 is a perspective view of the invention.

FIG. 2 is an end view of the invention.

FIG. 3 is a side view of the invention.

FIG. 4 is a sectional side view of the invention.

FIG. 5 is a perspective view of an alternative embodiment of the invention.

FIG. 6 is an end view of the alternate embodiment of the invention.

FIG. 7 is an exploded view of portion of alternate embodiment.

DESCRIPTION OF PREFERRED EMBODIMENT

FIG. 1 shows a perspective view of a bird guard 1 installed on a wire 2 over an insulator atop a support 4. The bird guard includes a substantially cylindrical member 5 with a gap 6 for fitting over the wire 2 as shown in FIG. 2. The cylindrical member 5 has a substantial notch 7 for accommodating different insulator 3 designs. Tails 8 are attached to the cylindrical member 5 to secure the bird guard 1 to the wire 2. The tails 8 are wrapped around the wire 2. They are pre-formed into a helix. Tails 8 can be attached with a hot stick to protect the installer from a charged line. The tails 8 are attached to the cylindrical member 5 by a nonconductive fastener 9.

FIG. 2 shows an end view of the invention and details the gap 6 that allows the device to be installed over existing wires 2.

FIG. 3 shows a side view which highlights the notch 7 for going over the insulator 3.

FIG. 4 shows a sectional view with the insulator in phantom. In installation the gap 6 is slightly offset from being directly below the line. This orientation provides some lift protection from wind gusts.

FIG. 6 shows another embodiment of the invention. The invention described above provides a device for insulating the bird or other creature from the wire 2 so that they do not become the arc point and get injured or more likely killed. The alternate embodiment discourages birds, squirrels or other creatures from lighting on the wire 2 by including vertical spikes 10 attached to the cylindrical member 5 with holes 11 for receiving fasteners 12.

This invention also contemplates using multiple guards to cover longer spans if necessary by twisting a tail 8 under a cylindrical member 5 at the point where a tail would be attached and merely attaching a tail at each end.

Obviously, numerous (additional) modifications and variations of the present invention are possible in light of the above teachings. It is, therefore, to be understood that within the scope of the appended claims, the invention may be practiced otherwise than as specifically described herein.

What is claimed is:

1. An apparatus for protecting animals from contacting power lines comprising:

a single cylindrical member for engaging a wire comprising a transverse notch substantially about the center section of said single cylindrical member, said transverse notch forming a gap wherein an insulator is accommodated when a wire is engaged; and securing means for securing said cylindrical member to said wire.

2. An apparatus as described in claim 1 wherein said cylindrical member comprises a dielectric material.

3. An apparatus as described in claim 2 wherein said dielectric material comprises a polymer material.

4. An apparatus as described in claim 1 wherein said securing means comprises at least one helical member for wrapping around said wire.

5. An apparatus as described in claim 4 further comprising a spike disposed perpendicular to a longitudinal axis of said cylindrical member.

* * * * *